W. C. REINOEHL.
FRUIT CLIPPER.
APPLICATION FILED SEPT. 23, 1913.

1,101,331. Patented June 23, 1914.

WITNESSES:
Frank C. Ward
Raymond V. Coffey

INVENTOR.
William C. Reinoehl
BY
Millard Edd, ATTORNEY.

UNITED STATES PATENT OFFICE.

WILLIAM C. REINOEHL, OF OMAHA, NEBRASKA.

FRUIT-CLIPPER.

1,101,331. Specification of Letters Patent. Patented June 23, 1914.

Application filed September 23, 1913. Serial No. 791,414.

*To all whom it may concern:*

Be it known that I, WILLIAM C. REINOEHL, a citizen of the United States, residing in the city of Omaha, in Douglas county, in the State of Nebraska, have invented certain new and useful Improvements in Fruit-Clippers, and have described the same in the following specification, illustrated by the accompanying drawings.

My invention relates to that class of fruit clippers which are used in attachment to the hand of the operator, and which sever the individual stems of apples, oranges, grape clusters and other fruits by shearing.

It is the object of the invention to render a fruit clipper of this class operable by the movement of a single finger, while leaving the remaining fingers, as well as the thumb and other parts of the operator's hand, free to grasp, hold, feel and manipulate the individual fruit or cluster of fruit both before and during and after the cutting of its stem; to facilitate the delivery of the fruit from the hand of the picker to a basket or other temporary receptacle; and in general to expedite the harvesting of the fruit and increase the efficiency of the fruit clippers. To accomplish these objects I incorporate in a fruit clipper of the specified class a pair of shears having blades separately attachable to the index finger, and a hose attached to the shears.

Figure 1:
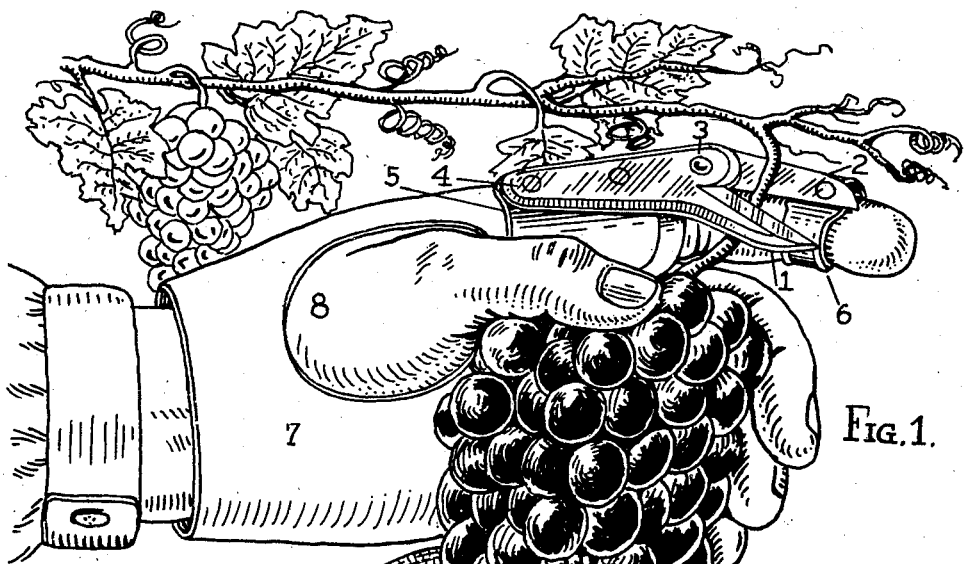
Figures 2, 4:
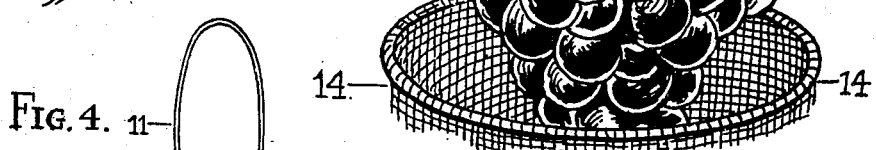
Figure 3:
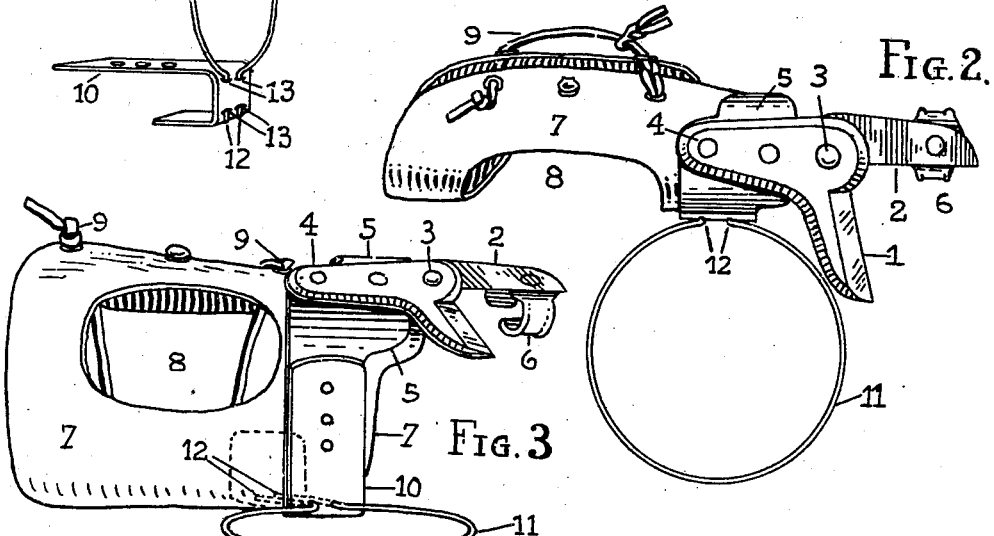

In the accompanying drawings, illustrating the best manner in which I have contemplated applying the principles of the invention, Figure 1 is a perspective view of a fruit clipper which is constructed in accordance with these principles, and which is positioned as in actual use. Fig. 2 is a side elevation of the same clipper, without the hose. Fig. 3 is a perspective view of Fig. 2. Fig. 4 is a detail in perspective, showing the means for distending and attaching the mouth of the hose.

In this illustrative and illustrated specimen of my invention, the shear blades, pivoted together by the pin 3, are denoted by the numerals 1 and 2 respectively. The relatively stationary blade 1 has the shank 4, which is rigidly attached to the hand-plate 5, the latter being of irregular shape conformable to the side of the forefinger in the position shown, and having a flat shank resting in the palm of the hand. The pivoted blade 2 has pivoted thereto a bent metallic finger-plate, or lug, 6, which resembles a ring and is adapted to clasp the same forefinger at or just below the first finger joint. To the hand-plate 5 is secured the leather mitt 7, which has the thumb-hole 8 and is fastened together at the back of the hand by the lacing 9. The metallic plate hook 10, shown in Fig. 4, is adjustably pivoted to the flat shank of the hand-plate 5, and fits roughly the outer margin of the palm of the hand. This hook serves to retain the handplate in its shown position, and draws the concave portion of the same against the side of the forefinger and against the inner margin of the palm. Applied to the hand and to the fruit stem as shown in Fig. 1, the shears are operatively opened and shut by alternately straightening and flexing the index finger at the middle joint.

To the hook 10 is removably attached the wire loop 11, having the arms 12, which are inserted for purposes of attachment in the holes 13 through the hook. This loop holds open the mouth of the attached hose 14, through which the clipped specimens or clusters of fruit, one after another, when let go from the hand above, may slide down to their immediate destination.

I claim as my invention—

1. A fruit clipper of the specified class, comprising a pair of mutually pivoted shear blades, and alining means for mounting the blades respectively upon two relatively movable parts of one of the operator's fingers.

2. A fruit clipper of the specified class, comprising two mutually pivoted shear blades, means for holding one of the blades in a fixed position relative to the operator's index finger, and a lug at the free end of the other blade for attaching the latter to the same finger.

3. A fruit clipper of the specified class, comprising two mutually pivoted shearing blades, a finger-holding lug fastened to the free end of one of the blades, a bent hand-plate fitted to the side of the forefinger and to the palm of the hand and fastened to the shank of the other blade, and a plate hook pivoted to the shank of the hand-plate.

4. A fruit clipper of the specified class, comprising two coacting shear blades pivoted together, a finger-lug pivoted to the free end of one blade, and a bent hand-plate fitted to the side of the forefinger and to the palm of the hand and fastened to the shank of the other blade.

5. A fruit clipper of the specified class, comprising two coacting shear blades pivoted together, a finger-lug on the free end of one of the blades, a bent hand-plate fitted to the side of the forefinger and to the palm of the hand and fastened to the shank of the other blade, a plate-hook pivoted to the shank of the hand-plate, and a hose attached to the plate-hook.

In testimony whereof I subscribe my name hereto in the presence of two witnesses.

WILLIAM C. REINOEHL.

In the presence of—
   WILLARD EDDY,
   I. S. LEAVITT.